No. 793,810. PATENTED JULY 4, 1905.
O. O. WANGEN.
FISH HOOK.
APPLICATION FILED MAR. 18, 1905.

WITNESSES:
M. A. Schmidt
Geo. E. Few

INVENTOR
Oloff O. Wangen
BY
Milo B. Stevens & Co.
ATTORNEYS

No. 793,810. Patented July 4, 1905.

UNITED STATES PATENT OFFICE.

OLOFF O. WANGEN, OF CHICAGO, ILLINOIS.

FISH-HOOK.

SPECIFICATION forming part of Letters Patent No. 793,810, dated July 4, 1905.

Application filed March 18, 1905. Serial No. 250,764.

*To all whom it may concern:*

Be it known that I, OLOFF O. WANGEN, a citizen of the United States, residing at Chicago, in the county of Cook and State of Illinois, have invented new and useful Improvements in Fish-Hooks, of which the following is a specification.

This invention is a spring-actuated or trap fish-hook having in the middle a hook to receive the bait and two side hooks actuated by a pull on the middle hook to strike sidewise into the body of the fish.

Figure 1:
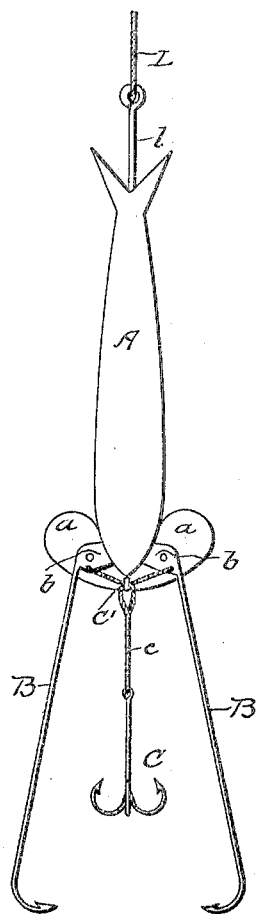
Figure 2:
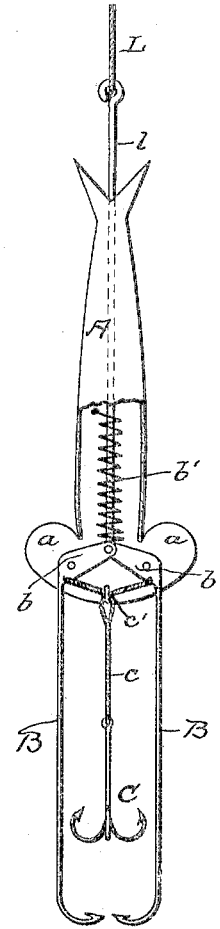

The invention is illustrated in the accompanying drawings, Figure 1 being a side view of the device with the side hooks open, and Fig. 2 a similar view, partly in section, with said hooks closed.

Referring specifically to the drawings, A indicates a body having the shape of a small fish or minnow, from which extends a rod $l$, to the rear end of which the line L is attached. This body has at the head fins or flanges $a$, to which are pivoted the oppositely-disposed side hooks B, which have at the shank behind the pivot arms $b$, which work through a slit in the head of the body and are connected to the lower end of the rod $l$. A weak spring $b'$ is coiled around this rod and is connected at its upper end to the body of the fish and at its lower end to the arms $b$. This spring is in compression and serves to hold the hooks B open by pressing down on the arms $b$.

The bait-hook is indicated at C, located between the side hooks, and is connected by cords $c$ to the hooks B below their pivots, the cords being crossed or passed through an eyelet $c'$ at the nose of the fish.

In operation the trap-hooks B are normally forced open by the pressure of the spring $b'$. When the hook C is nibbled, the pull tends to draw the hooks B together, and this action may be assisted or completed by pull on the line, striking said hooks into the body of the fish.

What I claim as new, and desire to secure by Letters Patent, is—

A fish-hook comprising a body, impalement-hooks pivoted thereto and arranged to swing toward each other and having offset arms operatively connected to the line, means to normally open said hooks, and a bait-hook located between said hooks and having connections therewith arranged to close said hooks when the bait-hook is pulled.

In testimony whereof I have signed my name to this specification in the presence of two subscribing witnesses.

OLOFF O. WANGEN.

Witnesses:
SIGNA FELTSKOG,
H. G. BATCHELOR.